United States Patent
Hollenbaugh, Jr. et al.

[11] Patent Number: 6,089,576
[45] Date of Patent: *Jul. 18, 2000

[54] LOW CREEP POLYTETRAFLUOROETHYLENE GASKETING ELEMENT

[75] Inventors: Donald L. Hollenbaugh, Jr., North East, Md.; Gordon L. McGregor, Landenberg, Pa.; Raymond B. Minor, Elkton, Md.

[73] Assignee: W. L. Gore & Associates, Inc., Newark, Del.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/665,282

[22] Filed: Jun. 17, 1996

Related U.S. Application Data

[60] Continuation of application No. 08/456,875, Jun. 1, 1995, abandoned, which is a division of application No. 08/300,018, Sep. 2, 1994, abandoned, which is a continuation-in-part of application No. 08/187,442, Jan. 25, 1994, Pat. No. 5,364,699, which is a division of application No. 07/778,294, Oct. 17, 1991, Pat. No. 5,281,475.

[51] Int. Cl.$^7$ ........................................... F16J 15/10
[52] U.S. Cl. ........................................... 277/650; 277/946
[58] Field of Search ..................... 428/422, 357, 428/364, 375; 277/644, 650, 652, 654, 633, 946

[56] References Cited

U.S. PATENT DOCUMENTS

| | | |
|---|---|---|
| 13,145 | 6/1855 | Tuck . |
| 143,705 | 10/1873 | Mayall ..................................... 277/229 |
| 292,783 | 2/1884 | Beldam . |
| 425,042 | 4/1890 | Moseley et al. ........................ 277/229 |
| 719,042 | 1/1903 | Reinhold . |
| 1,151,344 | 8/1915 | Crane ..................................... 277/229 |
| 1,459,744 | 6/1923 | Ostrander . |
| 1,525,056 | 2/1925 | Wendell . |
| 1,909,534 | 5/1933 | Hall ........................................ 277/229 |
| 2,213,659 | 9/1940 | Vincke . |
| 2,228,779 | 1/1941 | Pavlecka et al. . |
| 2,335,190 | 11/1943 | Minch . |
| 2,664,374 | 12/1953 | Slayter et al. . |
| 2,666,005 | 1/1954 | Norehad . |
| 3,031,357 | 4/1962 | Balkin et al. . |
| 3,126,699 | 3/1964 | Lefevre et al. . |
| 3,894,742 | 7/1975 | Trelease . |
| 3,953,566 | 4/1976 | Gore . |
| 3,962,153 | 6/1976 | Gore . |
| 4,096,227 | 6/1978 | Gore . |
| 4,187,390 | 2/1980 | Gore . |
| 4,409,283 | 10/1983 | Boyle, Jr. ............................... 277/229 |
| 4,985,296 | 1/1991 | Mortimer, Jr. . |
| 5,061,561 | 10/1991 | Katayama . |
| 5,091,252 | 2/1992 | Hruska et al. . |
| 5,160,773 | 11/1992 | Sassa . |
| 5,281,475 | 1/1994 | Hollenbaugh, Jr. et al. . |
| 5,288,552 | 2/1994 | Hollenbaugh, Jr. et al. . |
| 5,301,960 | 4/1994 | Meyer et al. . |
| 5,494,301 | 2/1996 | Hamilton et al. ...................... 277/229 |

FOREIGN PATENT DOCUMENTS

| | | |
|---|---|---|
| 0 304 141 | 2/1989 | European Pat. Off. . |
| 52-70149 | 12/1975 | Japan . |
| 94/24467 | 10/1994 | WIPO . |

OTHER PUBLICATIONS

Literature: Industrial Sealants, GORE–TEX(R) Valve Stem Packing, 1989, W.L. Gore & Associates, Inc.
Literature: INERTEX(TM) Valve Stem Packing, (Author unknown) (Date unknown).
Literature: GORE–TEX(R) Joint Sealant, W. L. Gore & Associates, Inc., 1992.

Primary Examiner—Anthony Knight
Assistant Examiner—John L. Beres
Attorney, Agent, or Firm—Allan M. Wheatcraft

[57] ABSTRACT

The present invention is an improved gasket for use in a wide variety of sealing applications. The gasket comprises a sheet of expanded polytetrafluoroethylene (PTFE) that is helically wrapped around itself and sealed in that orientation. This construction produces a gasket that has significant tensile strength in both its longitudinal and transverse axes. As such, the gasket of the present invention retains all of the operational advantages of PTFE while being quite resistant to creep.

17 Claims, 8 Drawing Sheets

LOW CREEP POLYTETRAFLUOROETHYLENE GASKETING ELEMENT

RELATED APPLICATIONS

The present application is a continuation of U.S. patent application Ser. No. 08/456,875, filed Jun. 1, 1995, now abandoned, which is a division of U.S. patent application Ser. No. 08/300,018, filed Sep. 2, 1994, now abandoned, which is a continuation-in-part of U.S. patent application Ser. No. 08/187,442, filed Jan. 25, 1994, now U.S. Pat. No. 5,364,699, which is a division of U.S. patent application Ser. No. 07/778,294, filed Oct. 17, 1991, which issued as U.S. Pat. No. 5,281,475 on Jan. 25, 1994.

BACKGROUND OF THE INVENTION

1. Field of the Invention

The present invention relates to fluoropolymer gasketing elements having improved "creep" or "cold flow" characteristics.

2. Description of Related Art

Polytetrafluoroethylene (PTFE) has demonstrated utility as a material in many different areas. As an industrial material, such as for example a gasket, PTFE has exhibited utility as a material for use in harsh chemical environments, which normally degrade many conventional metals and polymeric materials. PTFE is also usable over a broad temperature range, from as high as 260° C. to as low as near −273° C.

However, conventional non-porous polytetrafluoroethylene gasket materials, which have been compression molded or extruded and subsequently heated to a temperature above 345° C., exhibit poor mechanical properties, such as low tensile strength and low "cold flow" resistance. Cold flow (also known as "creep") is a particular problem with PTFE materials, which have a tendency to spread out under compressive load, thereby reducing their effective sealability over time. Accordingly, despite a number of highly desirable properties, use of these materials are generally limited to situations not requiring high tensile strength or good creep resistance.

Polytetrafluoroethylene may be produced in a porous expanded form as taught in U.S. Pat. No. 3,953,566 to Gore. Porous expanded polytetrafluoroethylene (ePTFE) is of a higher strength than unexpanded forms of PTFE, has the chemical inertness of conventional PTFE, and, when used as a gasket, has even a wider temperature range of use up to as high as 315° C. An example of a porous expanded polytetrafluoroethylene gasket material is GORE-TEX® Joint Sealant (manufactured by W. L. Gore & Associates, Inc., Elkton, Md.). Porous ePTFE joint sealants provide an excellent seal in applications having relatively wide sealing surfaces and where sufficient clamping loads can be applied to them so that, as the sealant spreads between the sealing surfaces to form a thin, wide gasket, the level of compressive stress needed to densify the gasket and to provide the desired sealability is developed. Consequently, these gaskets are often not well suited to applications having narrow sealing surfaces or requiring relatively thick gaskets.

Porous ePTFE gasket materials that have not been fully compressed will not perform as a barrier to organic liquids having surface tensions under 50 dynes/$cm^2$. Also, they will exhibit a higher measure of creep, which results in a loss of thickness and an increased width of the gasket over time. Both the loss of gasket thickness and the increase in the gasket width contribute to a lower surface stress of the gasket in service.

Polytetrafluoroethylene sealant materials consisting of polytetrafluoroethylene cores upon which are wrapped tapes of polytetrafluoroethylene are known in the art. For example, GORE-TEX® Valve Stem Packing (manufactured by W. L. Gore & Associates, Inc., Elkton, Md.) and INERTEX Valve Stem Packing (available from Inertech, Inc., Monterey Park, Calif.), consist of porous expanded polytetrafluoroethylene cores upon which are wrapped tapes of porous expanded polytetrafluoroethylene. This type of commercially available wrapped PTFE sealant material is suitable for use as a compression packing where it is confined within a defined volume; however, when used as a gasket in an unconfined volume, these gaskets exhibit undesirable creep characteristics over a period of time when under a compressive load.

U.S. Pat. No. 5,160,773 to Sassa describes a sealing material of polytetrafluoroethylene felt encapsulated by a porous polytetrafluoroethylene sheet laminated to a melt-processible thermoplastic fluoropolymer. The encapsulated PTFE felt material is engineered for use as a "wiper" seal for moving surfaces in which very low clamping forces are applied to the seal surfaces to obtain a seal against low pressure fluids. The encapsulated felt material is generally not suited for use as a static seal against gases or fluids under pressure as a very high clamping load is required to compress it and, as with the materials described above, the encapsulated felt material deforms to a thin, wide shape as it becomes fully compressed and can exhibit undesirable creep characteristics. While the outer wrap of the encapsulated felt serves as a liquid-impermeable seal, it does not have sufficient strength to retard cold-flow of the core under high compressive stresses.

As a result of dimensional changes due to cold flow or creep, many commercially available PTFE gaskets require additional clamping force applied to the gasket some period of time after installation of the gasket. This is a highly undesirable property in a gasket material. Repetitive adjustment of clamping force is not possible in uses where a specific height of gasket must be maintained during use for functional or safety reasons. For example, when used as static seals between multiple plates of plate-and-frame heat exchangers and plate-and-frame filters any creep-induced thickness reduction of the gasket material between the plates is additive and, when multiplied by the number of plates in the unit, can result in a significant reduction in the gasket clamping load, which can lead to severe leakage problems that cannot be corrected.

Although it has not been a problem to produce a "form in place" conformable PTFE gasket material that has strength oriented in the longitudinal direction of the material, this material tends to be limited in its functional properties. This is due to the manner in which the "form in place" material is expanded in this one direction. This processing creates orientation, and therefore strength, primarily in just the longitudinal direction. Thus the resistance to cold flow is primarily in just the longitudinal direction. However, for optimum sealing performance in a gasket, resistance to cold flow is desired in both the longitudinal and transverse directions.

W. L. Gore & Associates, Inc., produces a number of gasket materials that comprises a porous expanded PTFE core wrapped in a tape of expanded PTFE material. Various forms of this material are the subject of a number of co-pending United States patent applications. One commercially available example of this material is sold as GORE-TEX® gasket material for use in sealing plate-and-frame heat exchangers. The advantage of this two-stage construction is that the wrapping of the core material with a high strength tape ends to resist the flow of the core material out of its initial dimensions (i.e., the tape wrap confines the core from spreading out transversely under stress). While this material works quite well, it is believed that even further improvements may be possible in ease in processibility as well as creep characteristics and other properties of the gasket material.

Accordingly, it is a primary purpose of the present invention to provide a gasket that has the beneficial properties of expanded PTFE while being resistant to creep.

It is a further purpose of the present invention to provide a PTFE gasket that has creep resistance in both a longitudinal and transverse direction.

These and other purposes of the present invention will become evident from review of the following specification.

SUMMARY OF THE INVENTION

The present invention is a polytetrafluoroethylene (PTFE) gasketing material comprising a rolled, self-adhered sheet of PTFE that under compressive forces provides improved resistance to creep in both the longitudinal and transverse directions. Where desired, creep resistance with the present invention can be achieved in a single component gasket material without the need of tape wraps or other flow constraining mechanisms.

The gasket material of the present invention may be formed in virtually any shape, including as a fiber, thread, rod, or tube, and may be filled with particulate fillers or coated with polymeric materials prior to production of the PTFE gasketing element. Additionally, other elements (i.e., filaments, wires, or sheet elements) may be readily incorporated with the PTFE sheet used to form the present invention to produce improved gasket devices.

The gasket of the present invention forms an effective seal that has increased resistance to distortion under compression over traditional form-in-place PTFE gaskets. As a result, the gasket of the present invention can be used in many applications where it has been difficult to apply a PTFE gasket, such as in joints that are difficult to access for periodic maintenance, or as seals requiring high compressive forces but where specific spacing must be maintained at the joint.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved gasketing element constructed from polytetrafluoroethylene (PTFE) and having significantly improved cold flow or "creep" properties.

Figure 1:
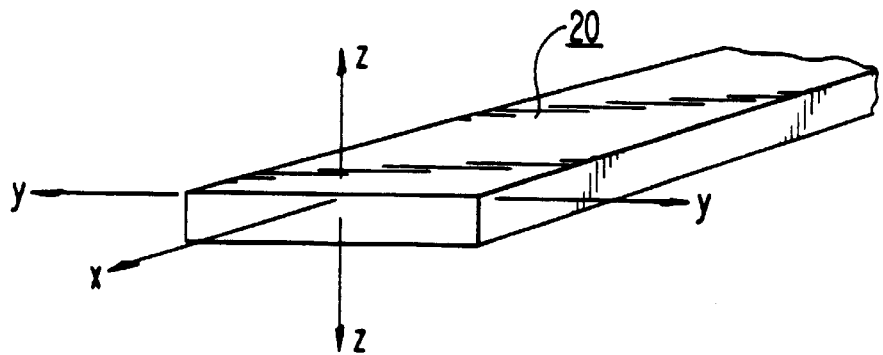
FIG. 1 is a three-quarter perspective view of a conventional slit film element.

Shown in FIG. 1 is a conventional gasket element 20 constructed from an expanded polytetrafluoroethylene (ePTFE) material. As has been explained, due to the tendency of this material to creep, when it is placed under a compressive pressure in the "z" direction over time, the material tends to spread in the "y" direction (and to a lesser degree in the "machine" or longitudinal "x" direction), compromising the seal provided by this material.

Figure 2:
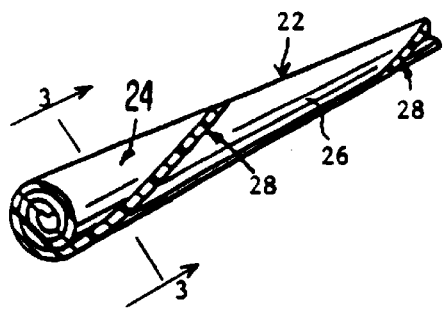
FIG. 2 is a three-quarter perspective view of a helically wrapped gasket element of the present invention.
Figure 3:
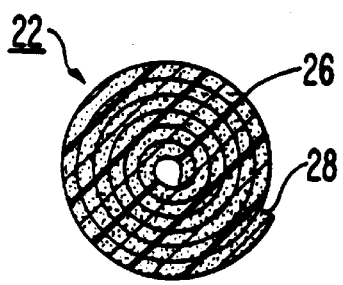
FIG. 3 is a cross-section view along line 3—3 of FIG. 2.

Shown in FIGS. 2 and 3 is one embodiment of a gasket 22 of the present invention. The gasket 22 of the present invention comprises a helically rolled self-adhered sheet 24 having an exposed outside surface 26 and a spiraling seam 28. The seam 28 is formed by adherence of sheet to itself in the manner shown. As is shown in FIG. 2, the seam 28 forms a helical wrap encircling the gasket element along its longitudinal length.

"Helical" as used herein is intended to include any spiral structure formed through wrapping a sheet about a central longitudinal axis of an element.

The gasket 22 of the present invention can be produced from a sheet (including a strip, film, or composite material) of PTFE, microporous PTFE, or preferably an expanded microporous PTFE (ePTFE) as taught in U.S. Pat. Nos. 3,953,566 and 4,187,390 to Gore, incorporated herein by reference. Preferably the sheet of PTFE has a width at least 10 times its thickness. The gasket may be formed in a variety of shapes and sizes, and may include strands, threads, rods, or tubes having an outside surface with a substantially round, elliptical, or rectangular profile. The gasketing elements each preferably has a single spiraling seam.

Figure 4:
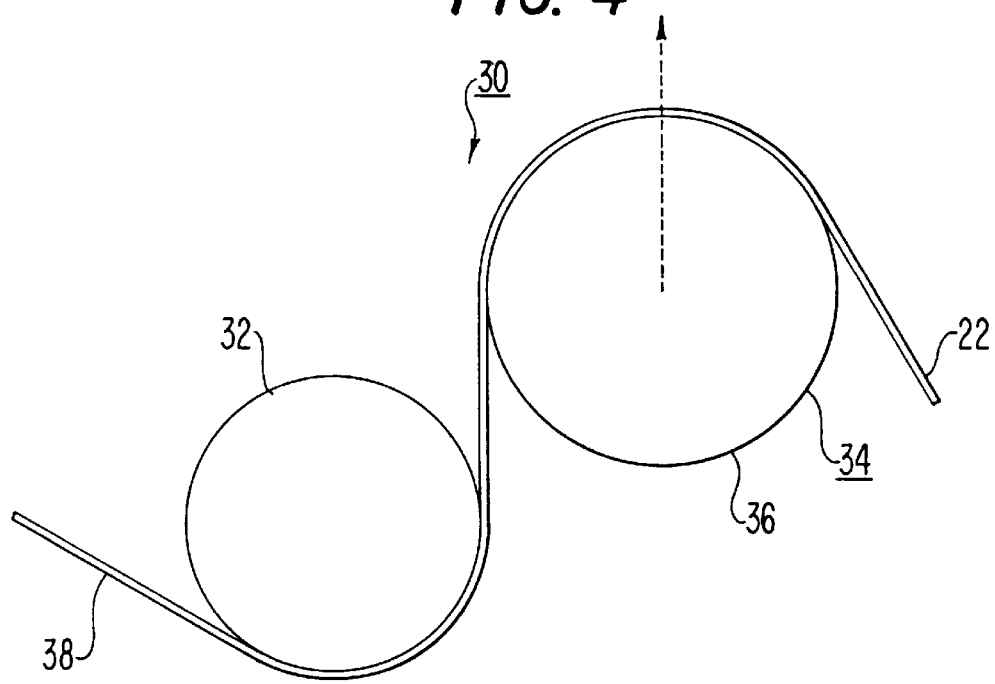
FIG. 4 is a side elevational view of one embodiment of apparatus used to produce the gasket material of the present invention.
Figure 5:
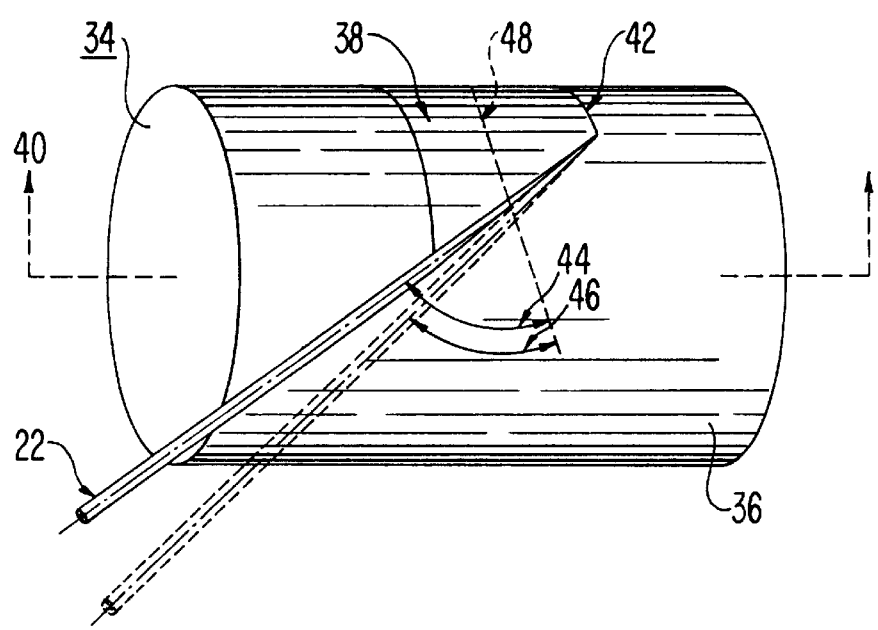
FIG. 5 is a three-quarter isometric view of one drum of the apparatus shown in FIG. 4.

FIGS. 4 and 5 show one embodiment of a machine 30 for forming the PTFE elements of the present invention. The machine comprises a feed control 32, such as a drum, and a conditioning drum 34 having an outside surface 36. PTFE sheet 38 is feed through the controlling means 32 onto conditioning drum 34 where it is spiral wound into the PTFE element 22 of the present invention. Although the feed control 32 is depicted as a drum, it should be understood that it may also include dancer arms, eyelet guides, or similar apparatus that aid in controlling the PTFE sheet 38 as it contacts the outside surface of the conditioning drum 34.

In order to form a PTFE element 22 of the instant invention, the PTFE sheet 38 is passed around the feed control 32 and is carefully fed onto the outside surface of the conditioning drum 34. The outside surface of the conditioning drum 34 should be prepared so that the sheet of PTFE is held tightly against the outside surface of the conditioning drum 34. If the PTFE sheet is an expanded microporous PTFE sheet, the surface of the conditioning drum 34 should be of a metal (e.g., stainless steel, aluminum) having a smooth or textured surface. Preferably, the surface of the metal is heated to maintain a temperature of between 300 and 450° C.

The conditioning drum 34 is rotated about an axis by a motor or other drive means so that the PTFE sheet 38 is caused to move circumferentially along the outside surface of the conditioning drum 34. Although it is preferred to directly drive the conditioning drum, the PTFE sheet may alternatively be used as the drive means for a "freewheeling" conditioning drum.

Referring to FIG. 5, a perspective view of the conditioning drum 34 perpendicular to orientation line 40 is depicted. While the PTFE sheet 38 is maintained in contact and tightly held by the surface of the conditioning drum 34, an edge 42 of the sheet of PTFE is removed from contact with the outside surface 36 of the conditioning drum 34 and the edge 42 is rolled over and is caused to contact the PTFE sheet that is still held to the surface of the conditioning drum 34. The removed edge contacts the PTFE sheet 38 at an angle 44 to a longitudinal axis of the PTFE sheet 38. The surface of the PTFE sheet 38 is "conditioned" in such a manner so that the removed edge adheres to the surface of the PTFE sheet held by the surface of the conditioning drum 34. By the term "conditioned," it is meant to define a physical state whereby the PTFE sheet will temporarily stick enough to the drum during processing so as to minimize slippage between the drum and the PTFE sheet. This can be accomplished through any number of means, including by heating the drum to cause the PTFE to become tacky, by including a filler within the PTFE material to impart some degree of tackiness (e.g., certain carbons, perfluoroalkoxy polymer (PFA), or fluorinated ethyleneproplylene (FEP)), and/or by providing a coating on the drum to provide this property.

As the conditioning drum 34 is rotated and the PTFE sheet 38 is caused to move circumferentially along the surface of the conditioning drum 34, the removed edge adhering to the surface of the PTFE sheet is thereby rolled upon itself producing a PTFE element 22 that is removed from the outside surface of the conditioning drum at an angle 46 to the longitudinal axis 48 of the PTFE sheet 38. As is shown in FIG. 5, the angle at which the PTFE element 22 is removed from the conditioning drum 34 is not necessarily the same angle that the removed edge of the PTFE sheet contacts the surface of the PTFE sheet 34 since a greater angle may be necessary to cause the PTFE sheet initially to roll than is necessary to remove the PTFE element from the conditioning drum once formation of element 22 has begun.

As the PTFE sheet 34 helically rolls upon itself forming the PTFE element 22, wraps of the PTFE sheet 38 come in contact with one another while on the drum surface 36 and adhere to one another thereby forming a PTFE element 22 containing multiple layers of PTFE helically rolled and adhered to themselves.

Heat may be used to increase the adhesion between the multiple layers of PTFE of the PTFE element during formation of the PTFE element. Heat can be applied by the conditioning drum surface or by other means, such as a heat element suspended above the conditioning drum. If the PTFE sheet is a sheet of expanded microporous PTFE, the conditioning drum may be heated to a temperature in excess of 327° C., or more preferably in excess of 342° C., so that the PTFE sheet is subjected to a heat treatment amorphous locking process as taught in U.S. Pat. No. 3,953,566 to Gore. The heat treatment amorphous locking process entails exposing the sheet of expanded microporous PTFE to temperatures in excess of 327° C., thereby reducing the crystalline content of the sheet of expanded microporous PTFE.

Alternatively, the sheet of expanded microporous PTFE may have previously been subjected to the heat treatment amorphous locking process. By previously subjecting the sheet of expanded microporous PTFE to the amorphous locking process, fraying of the PTFE sheet can be reduced when producing PTFE elements.

Still alternatively, the PTFE element may subsequently be subjected to the heat treatment amorphous locking process. The heat treatment amorphous locking process may be accomplished by placing the PTFE element in a high temperature enclosure. The high temperature enclosure is a heating means capable of maintaining temperatures in excess of 327° C. The high temperature enclosure may be any suitable form, such as a hot air convection oven, a radiant heat oven, or a molten salt bath. If the PTFE element is to be subsequently subjected to the heat treatment amorphous locking process, adhesion between the layers of the PTFE sheet must be sufficient to allow the heat treatment amorphous locking process without unwinding of the PTFE element. It should be appreciated that the same properties may be employed by subjecting the PTFE sheet to a heated surface.

The use of the high temperature enclosure for performing a subsequent heat treatment amorphous locking process may be particularly desirable for the efficient production of PTFE elements having large diameters.

The sheet of PTFE may be filled with various particulate fillers presently used to fill expanded microporous PTFE sheets as taught in U.S. Pat. No. 4,096,227 to Gore and U.S. Pat. No. 4,985,296 to Mortimer, Jr., incorporated herein by reference. Particulate fillers may be an inorganic material selected from the class consisting of metals, semi-metals, metal oxides, glass and ceramics. Particulate fillers may be an organic material selected from the class consisting of activated carbon, carbon black and polymeric resin. If a conductive particulate filler is used to fill the sheet of PTFE and is present in a sufficient amount, the sheet of PTFE may be static dissipative or conductive in nature, and PTFE elements produced from these sheets of PTFE may be static dissipative or conductive in nature as well.

The term "static dissipative" as used herein is intended to include any material with a volume resistivity of less than $10^9$ and greater than $10^2$ ohm cm as determined by ASTM D 257-90. The term "conductive" as used herein is intended to include any material having a volume resistivity of $10^2$ ohm cm or less as determined by ASTM D 257-90. "Particulate" is defined herein to mean individual particles of any aspect ratio including elements and powders.

Figure 6:
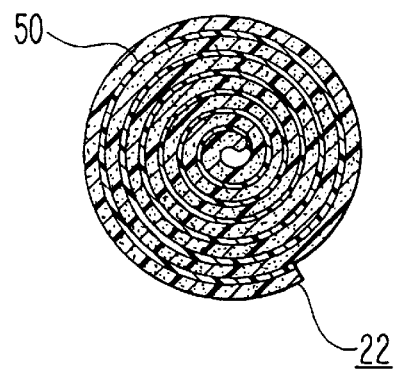
FIG. 6 is a cross-section view of another embodiment of the present invention.
Figure 7:
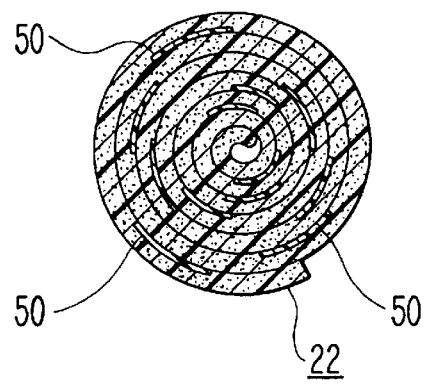
FIG. 7 is a cross-section view of yet another embodiment of the present invention.

Further embodiments of the present invention are illustrated in FIGS. 6 and 7. Referring to the embodiment of FIG. 6, prior to being helically wrapped the sheet of PTFE may be coated on one surface with a polymeric material 50. Particularly preferred polymeric materials for many applications are elastomeric polymers, such as natural rubber, synthetic rubbers, polyurethanes and fluoroelastomers. Whatever coating is chosen, it should be capable of withstanding elevated temperatures used in the formation of the element.

Coating the sheet of PTFE with an elastomer imparts increased resiliency to the PTFE element formed thereof. For other uses, the polymeric materials for use as the coating on the sheet of PTFE may also include ion exchange resins selected from the class consisting of perfluorosulfonic acid polymer and perfluorocarboxylic acid polymer. The purpose of the polymeric material is to provide improved properties, such as resilience, electro-chemical responsiveness, added strength reduction, further reduced cold flow, etc. Once coated, the material is then helically wrapped in the manner previously described to form PTFE element 22.

As is shown in FIG. 6, the sheet of PTFE may be coated with the polymeric material 50 so that the entirety of the surface is covered by a coating of the polymeric material thereby forming a continuous layer of polymeric material within element 22. Alternatively, as is shown in FIG. 7, the sheet of PTFE may be coated with the polymeric material in a discrete pattern, such as a series of stripes or dots, so that portions of the sheet of PTFE remain uncoated.

If the sheet of PTFE is either microporous PTFE or expanded microporous PTFE, the coating of polymeric material may be penetrated into the pores of the sheet of PTFE. This effectuates a tight bond between the coating of polymeric material and the sheet of PTFE. Polymeric materials for use as the coating on the PTFE sheet must resist any subsequent processing step needed to produce the element without excessive degradation.

Figure 8:
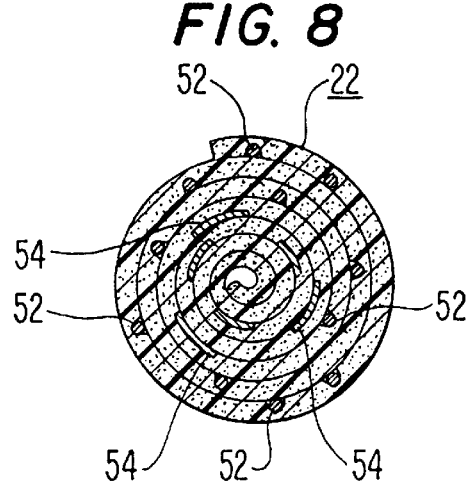
FIG. 8 is a cross-section view of still another embodiment of the present invention.

Another embodiment of the present invention is shown in FIG. 8. In this embodiment, the PTFE element 22 contains various useful components rolled within the PTFE element 22, such as filamentary elements 52 and/or sheet-like elements 54 interspersed amongst the layers of the helically rolled self-adhered sheet of PTFE. Filamentary elements 52 having utility in the instant invention include transmission filamentary elements, such as conductive wires, optical elements, or fine tubes. Other possibly useful filamentary elements include: structural filamentary elements for imparting high tensile strength to the PTFE element, such as graphite, aramid, glass, or ceramic elements; and elastomeric filamentary elements for imparting resiliency to the PTFE element, such as polyurethane beading, fluoroelastomer beading, natural rubber beading and synthetic rubber beading.

Still referring to FIG. 8, sheet-like elements 54 that may be suitable for use in the present invention may include polymeric films, metal foils, and metal screens. The sheet-like element should be sufficiently flexible to permit the sheet of PTFE to be helically wrapped to form the instant PTFE element.

The various components, either filamentary or sheet-like, contained within the PTFE element may be incorporated within PTFE sheet either prior to the helical rolling step or during the helical rolling step.

If a filamentary element 52 or sheet-like element 54 is to be located in or near the center of the PTFE element, the element is placed on or near the removed edge of the sheet of PTFE as the remainder of the sheet of PTFE is tightly held to the surface of the heated conditioning drum. Alternately, if an element is to be located within the adhered layers of the PTFE element, the element is placed a distance from the removed edge of the sheet of PTFE as the remainder of the sheet of PTFE is tightly held to the surface of the conditioning drum.

In all embodiments of the present invention, the diameter and density of the PTFE element may be varied through the use of sheets of PTFE having differing porosities, thicknesses, and/or widths. The diameter and density of the PTFE element are also determined by the tightness with which the layers of the sheets of PTFE are rolled in the formation of the element. When the sheets of PTFE are expanded microporous PTFE sheets, the diameter and density of the PTFE element may be varied through the use of the heat treatment amorphous locking step. The heat treatment amorphous locking step causes expanded microporous PTFE sheets to contract unless restrained by a physical means from doing so. A PTFE element of expanded microporous PTFE sheet will contract upon itself thereby tightening the rolled expanded microporous PTFE sheets upon themselves and decreasing the diameter while increasing the density of the resultant element.

It should be appreciated that the present invention contemplates that a sheet of expanded PTFE may comprise multiple layers of expanded PTFE sheet material that have been stacked or laminated together. The multiple layers of expanded PTFE material may then be rolled into a single coherent gasket of the present invention.

Figure 9:
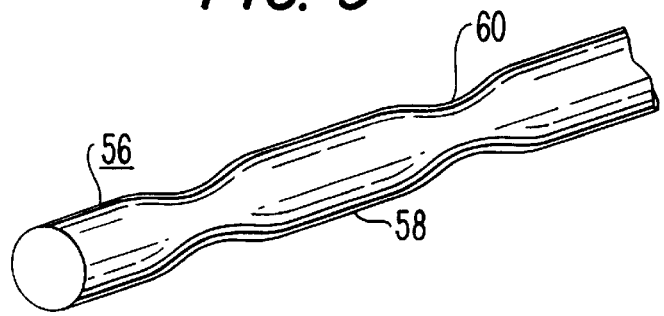
FIG. 9 is a three-quarter perspective view of a further embodiment of the present invention.

Referring to FIG. 9, a PTFE element may be produced from a sheet of PTFE in which the sheet contains non-parallel edges. When the sheet having non-parallel edges is rolled upon the conditioning drum, the resultant element 56 has a diameter that varies along its length from wide segments 58 to narrow segments 60.

Figure 10:
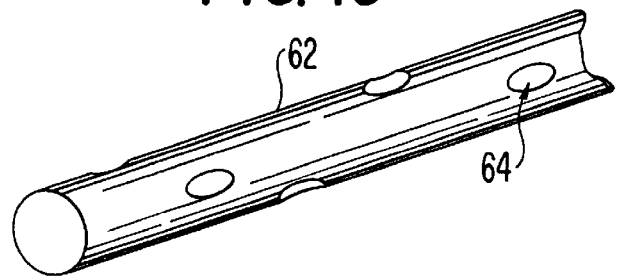
FIG. 10 is a three-quarter perspective view of still another embodiment of the present invention.

Further, as is shown in FIG. 10, a PTFE element may be produced from a sheet of PTFE in which discrete portions of the sheet are excised. When this sheet is rolled upon the conditioning drum, the resultant element 62 has a knobbed appearance, with one or more indentations or "dimples" 64 therein. If those portions of the sheet in which discrete portions of material have been excised are in the outermost layer in the PTFE element, the dimples 64 are formed on the outside surface of the element. By varying the diameter as well as the size and placement of the dimples may enable the PTFE element to mate with an enclosure with a matching profile.

Figure 11:
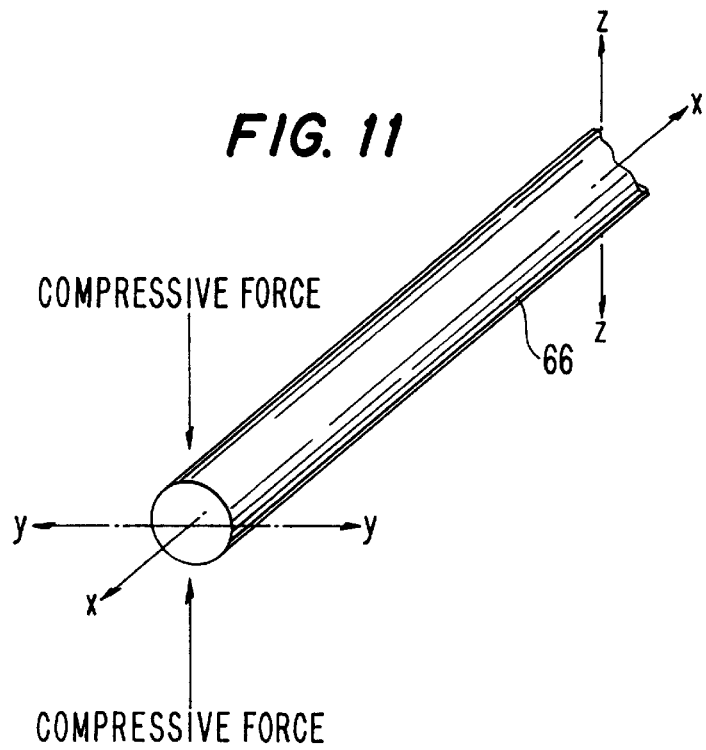
FIG. 11 is a force diagram representing compressive forces applied to a conventional form-in-place PTFE gasket.

The function and advantage of the present invention are best illustrated in FIGS. 11 through 15. Presently most "form in place" conformable PTFE gasket materials have strength oriented in the longitudinal direction of the material. This is due to the manner in which the "form in place" material is expanded in only the longitudinal direction. As shown in FIG. 11, this processing creates in a PTFE gasketing element 66 with orientation, and therefore strength, primarily in just the x-axis (longitudinal direction). Thus when a compressive force is applied in the normal direction (i.e., along the z axis), the resistance to cold flow is primarily in just the x-axis. For optimum sealing performance in a gasket, resistance to cold flow is desired in both the x-axis (longitudinal) and y axis (transverse) directions.

Figure 12:
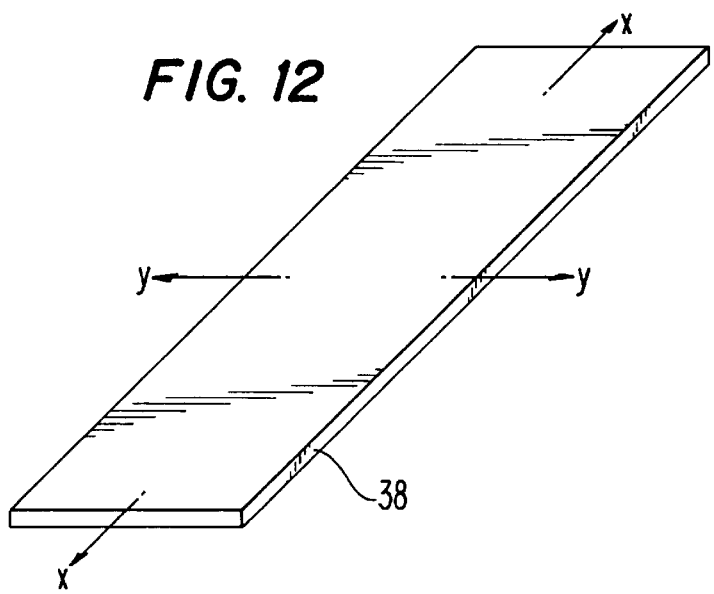
FIG. 12 is a force diagram of a sheet of PTFE material used to form the present invention.
Figure 13:
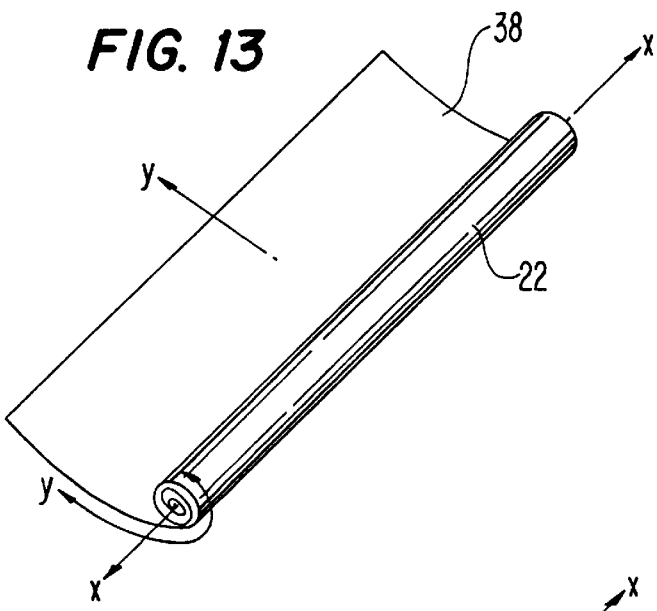
FIG. 13 is a force diagram of a sheet of PTFE material partially formed into the present Invention.
Figure 14:
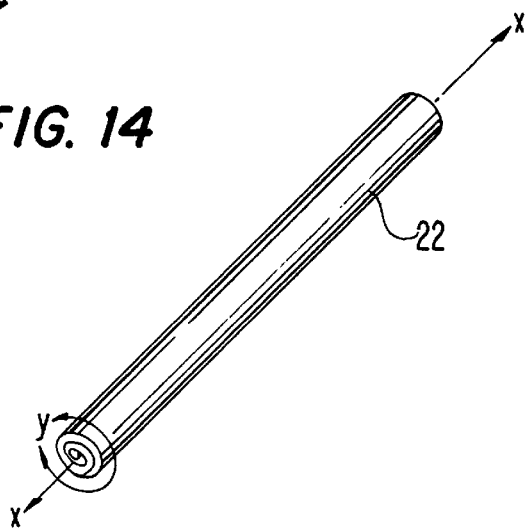
FIG. 14 is a force diagram of a gasket of the present invention.

Referring to FIG. 12, a sheet of expanded microporous PTFE 38 may be uniaxially expanded in only the x-axis or y axis, or, preferably, biaxially expanded (i.e., expanded in both the both x and y axis). Therefore, tensile strength can be enhanced and controlled in both axes. In the present invention, as is shown in FIGS. 13 and 14, the PTFE sheet 38 can be rolled upon itself to form PTFE gasketing element 22, thereby reorienting the strength from the y-axis of the sheet to become the strength in the circumferential direction throughout the thickness of the rolled element. For continuous materials, the x-axis or longitudinal direction is considered to be the "machine" (continuous) direction.

Figure 15A:
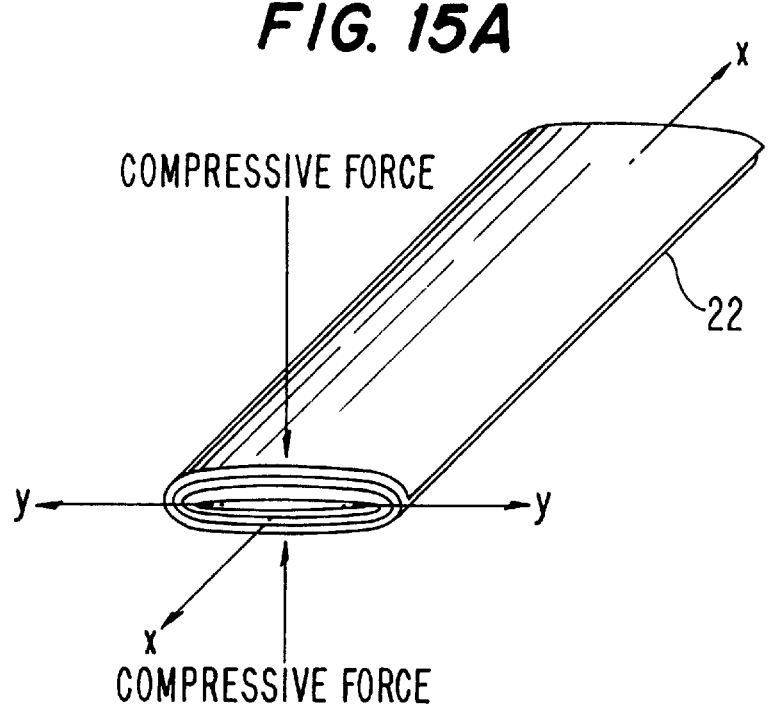
FIG. 15A is a force diagram of the inventive gasketing under a compressive force.

As is shown in FIG. 15A, when a compressive force is applied to an essentially oblong gasket element 22 of the present invention, the strength in the circumferential direction is reoriented into the y-axis of the gasketing element as the material yields to the force. This reoriented strength in the y-axis will increase the cold flow resistance in the y-axis. Thus an inventive gasketing element 22 can be created to have improved strength in both the x and y axis and therefore improved resistance to cold flow in both the x and y axis while under compressive forces.

Figure 15B:
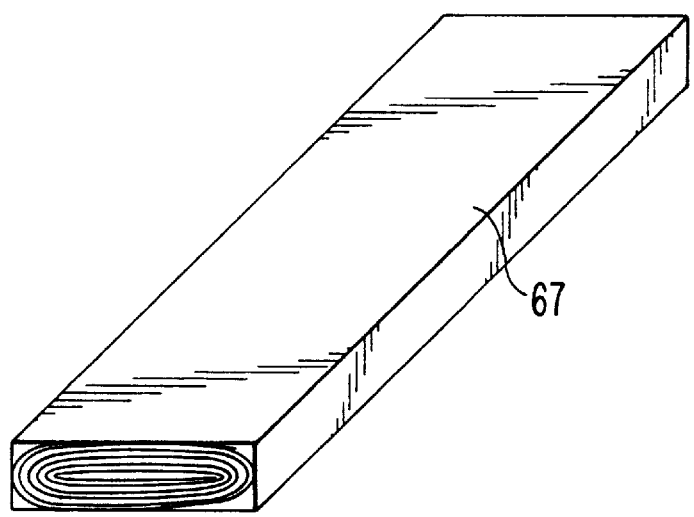
FIG. 15B is a isometric view of another embodiment of a gasket of the present invention that has been pre-compressed into a rectangular cross-section.

Another embodiment of a gasket 67 of the present invention is illustrated in FIG. 15B. In this case, the gasket 67, again an essentially oblong element (in this instance, having a rectangular cross-section), has been pre-compressed in a mold to produce a relatively uniform shape for use as a gasket.

The above methods for fabricating the inventive gasketing element describe techniques that will produce a substantially round profile element. Alternatively, the gasketing element can be further shaped or formed to have a cross section that has an oblong or rectangular profile. These profiles may provide suitable shapes for installation of various types.

Furthermore, it may be desirable to pre-compress the gasket of the present invention to minimize reduction in thickness during installation or use. This pre-compressed material would then have the improved orientation, with its improved strength and creep-resistance, of the final installed gasket of the present invention. In other words, a gasket of the present invention can be pre-formed (e.g., "pre-squashed" under a compressive force between plates or rollers) to supply the improved transverse axis strength and creep resistance that all forms of the gasket of the present invention provide once formed in place in a joint.

Figure 16:
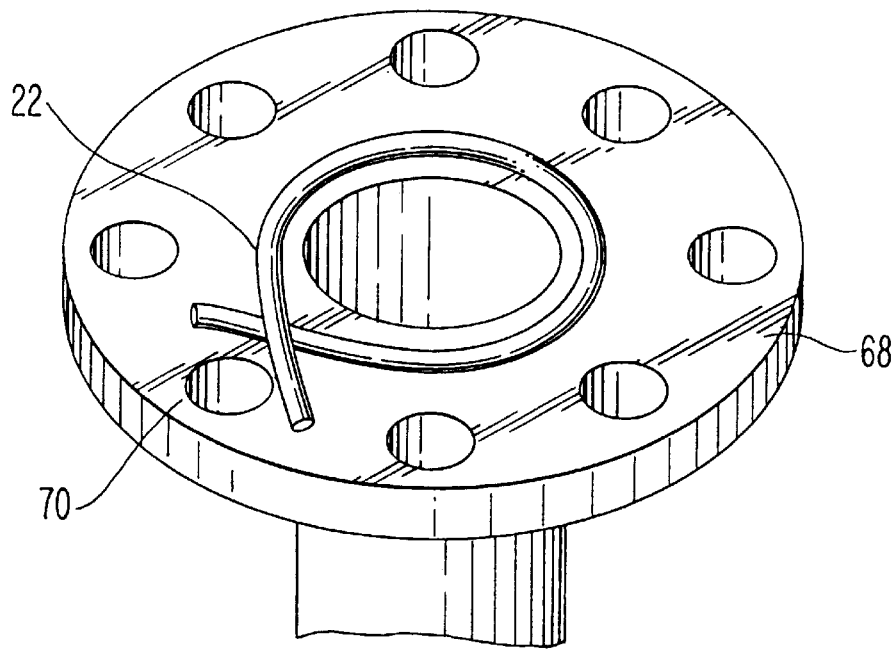
FIG. 16 is a three-quarter elevational view of a gasket of the present invention shown mounted around a flange.

Referring to FIG. 16, the inventive PTFE gasketing element 22 is shown in a flange sealing application. The gasketing element 22 is placed within the sealing portion of an eight bolt industrial pipe flange 68. As is shown, the two ends of the gasketing element 22 are overlapped at or near a bolt hole 70 to complete a seal.

Figure 17:
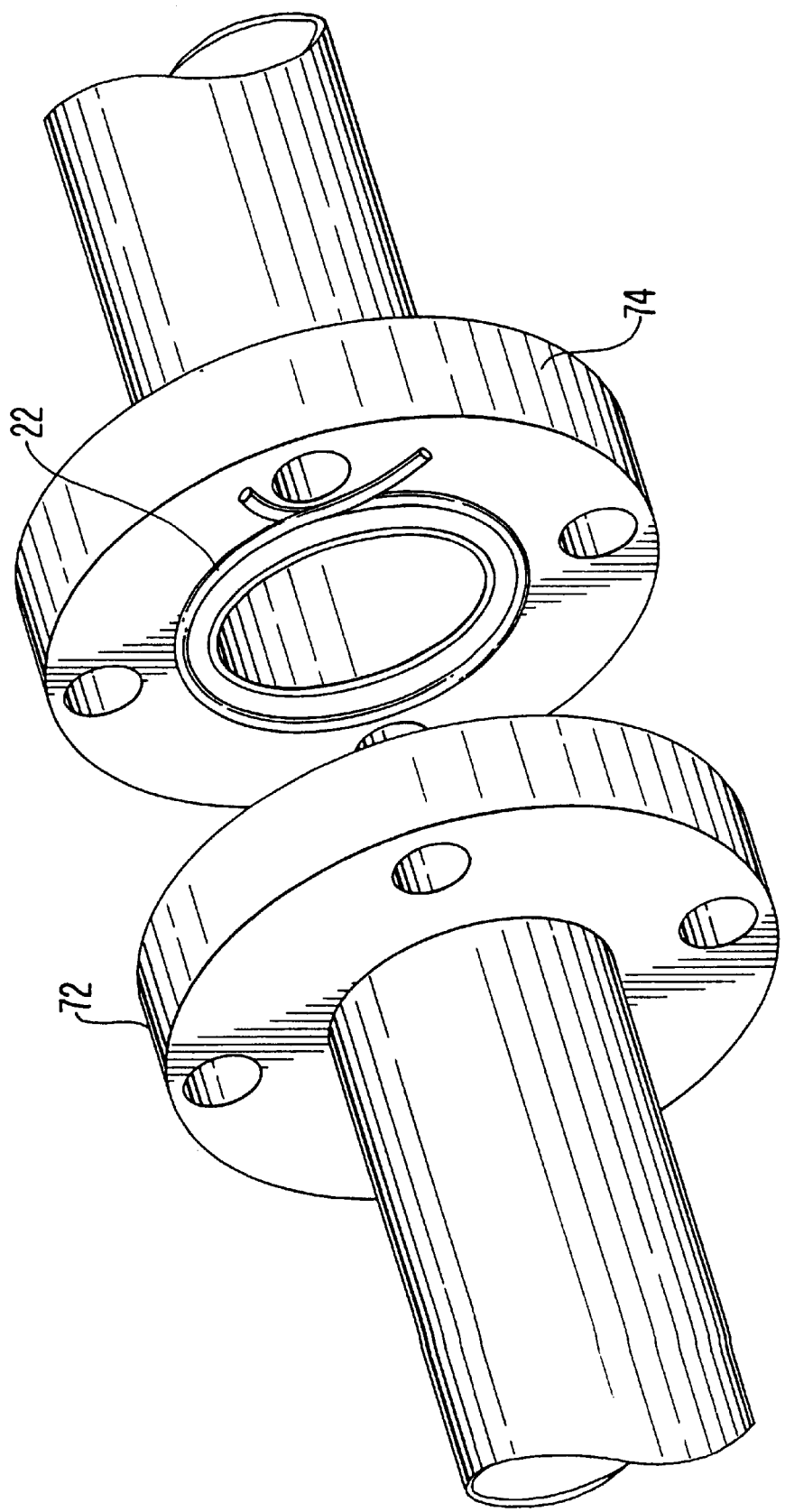
FIG. 17 is a three-quarter elevational view of the gasket of the present invention shown being installed between two flanges.

Another installation of a PTFE gasketing element 22 of the present invention is shown in FIG. 17. In this instance, the gasketing element 22 is mounted between two four-bolt industrial flanges 72, 74.

Figure 18:
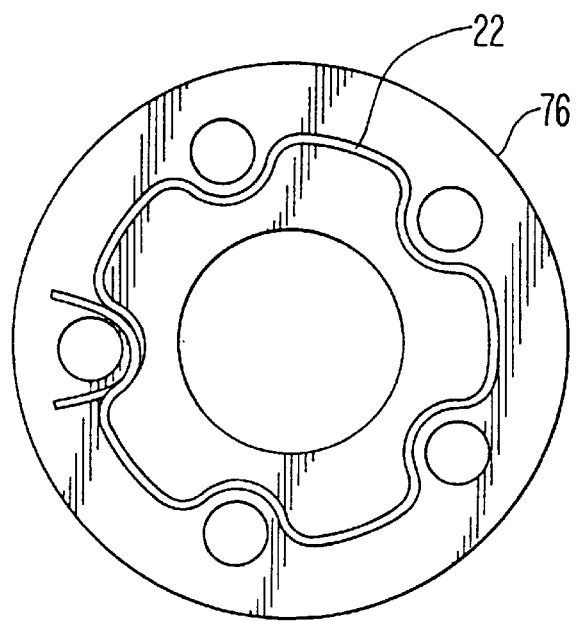
FIG. 18 is a plan view of one installation configuration of a gasket of the present invention.

FIG. 18 depicts one possible shape and pattern that can be formed by the gasketing element 22 of the present invention onto a pipe flanges 76.

Without intending to limit the present invention to such theory, it is believed that the gasket material of the present invention achieves its improved transverse strength and improved creep resistance by producing a transverse expansion during the processing and compression of the gasket material. As is taught by U.S. Pat. No. 3,953,566, the expansion of PTFE will significantly increase its strength in the direction of expansion. By orienting the PTFE material of the present invention in a transverse direction during processing, increased strength is imparted to the gasket material. As such, a transverse orientation is provided that significantly resistricts flow in the transverse direction when the gasket is under prolong compressive stress. In other words, the gasket material of the present invention will include a fibrillated structure oriented in more than one direction that will provide transverse strength, and inherent creep resistance, to the material.

The applications that have been shown relate to pipe flanges, however, the applications for the inventive gasketing element are numerous and not limited to pipe flanges. Applications such as plate and frame heat exchangers, automotive sealing surfaces, pump housings, etc. are all possible applications for the inventive element.

EXAMPLES

The following examples are intended to illustrate but not limit the present invention.

Test Methods

The tensile properties of the elements of the present invention as described below are determined using the method described in ASTM D882-81. The test performed varied from the test as published with respect to the material tested. ASTM D882-81 is for testing thin plastic sheeting and not filamentary elements. The difference is due to the dimensions of the sample. The thickness of the elements is determined through a snap gauge. Care is taken not to crush the sample with the presser foot of the snap gauge to obtain an accurate thickness.

The samples are tested on a constant rate of grip separation machine to break. Tensile strength and modulus of the samples are determined.

Example 1

A continuous PTFE sheet 152.4 mm wide and 0.1 mm thick produced from fine powder PTFE resin through paste-forming techniques was obtained. This PTFE sheet was passed through a bank of 152.4 mm diameter metal rollers heated to a temperature of 230° C. These heated metal rollers were driven independently from one another in such a manner so that the PTFE sheet was caused to rapidly expand at a ratio of 14 to 1 and to form an expanded microporous PTFE sheet as taught in U.S. Pat. No. 4,187,390 to Gore.

The sheet of expanded microporous PTFE was removed by hand from the final heated metal roller at a speed of approximately 9.1 revolutions per minute (rev/min) and an angle of approximately 45° from the longitudinal axis of the sheet of expanded microporous PTFE thereby causing the sheet of expanded microporous PTFE to helically roll upon itself and produce the inventive element. Thermally protective gloves were worn by the operator to prevent burns from the removed element. Care was taken to maintain sufficient tension upon the PTFE sheet so that it remained in contact with the surface of the final metal roller as the inventive element was removed.

The resultant element was continuous in length and substantially round in profile. The following physical properties were determined upon testing five samples taken from the inventive element.

| | |
|---|---|
| Diameter | 2.1 mm |
| Longitudinal Tensile Strength | 39,050 ± 834 KPa |
| Modulus | 403,700 ± 42,510 KPa |

Example 2

The expanded microporous PTFE sheet as produced in the first paragraph of Example 1 was subsequently fed from the bank of heated metal rollers onto a pair of 304.8 mm diameter metal drums heated to 365° C. The first of these metal drums helped to tension and to maintain the expanded microporous PTFE sheet in contact with the surface of the second heated metal drum. Since the metal drums were heated in excess of 327° C., the heat treatment amorphous locking process taught in U.S. Pat. No. 3,955,566 to Gore, column 3, lines 49–55, was performed on the expanded microporous PTFE sheet.

The sheet of expanded microporous PTFE was removed by hand from the second heated metal drum at a speed of approximately 9.1 rev/min and an angle of approximately 45° from the longitudinal axis of the sheet of expanded microporous PTFE thereby causing the sheet of expanded microporous PTFE to helically roll upon itself and produce the inventive element. Thermally protective gloves were worn by the operator to prevent burns for the removed element. Care was taken to maintain sufficient tension upon the PTFE sheet so that it remained in contact with the surface of the second heated metal drum as the inventive element was removed.

The resultant element was continuous in length and substantially round in profile. The following physical properties were determined upon testing five samples taken from the inventive element:

| Diameter | 1.3 mm |
| --- | --- |
| Longitudinal Tensile Strength | 100,400 ± 1,300 KPa |
| Modulus | 1,757,000 ±− 170,700 KPa |

Example 3

A filled PTFE sheet containing 50% by weight of a conductive carbon black powder (Ketjen black carbon available from AKZO Chemical) was obtained. The filled PTFE sheet was stretched at a 2:1 ratio, and was carefully fed onto a pair of metal drums. The first metal drum was heated to a temperature of 345° C. while the second metal drum was heated to 350° C. The metal drums were rotated as that the drums had a circumferential speed of approximately 1.1 rev/min. The speed of the drums was controlled by a foot pedal by the machine operator as the operator removed the resultant element from the second metal drum by hand. Thermally protective gloves were worn by the operator to prevent burns from the removed element. The sheet was removed at an angle from the longitudinal axis of the sheet of filled PTFE thereby causing the sheet of filled PTFE to roll helically upon itself and produce the inventive element. Care was taken to maintain sufficient tension upon the sheet of filled PTFE so that it remained in contact with the surface of the second heated metal drum as the inventive element was removed.

The resultant element was in the form of a tube having an open lumen. The following width filled PTFE sheets produced tubes having the following outside diameters:

| Sheet Width | Outside Diameter |
| --- | --- |
| 25.4 mm | 2.5 mm |
| 20.3 mm | 2.3 mm |
| 17.1 mm | 2.0 mm |
| 10.2 mm | 1.8 mm |

Example 4

A filled PTFE sheet containing 25% by weight of a conductive carbon black powder (Ketjen black carbon available from AKZO Chemical) was obtained. The filled PTFE sheet was expanded by stretching at a ratio of approximately 1.7:1.

This filled PTFE sheet was passed through a bank of 152.4 mm diameter metal rollers heated to a temperature of 230° C. These heated metal rollers were driven independently from one another in such a manner so that the filled PTFE sheet was caused to expand at various ratios to form an expanded microporous filled PTFE sheet as taught in U.S. Pat. No. 4,187,390 to Gore.

The expanded microporous filled PTFE sheet was subsequently fed onto a pair of 304.8 mm diameter metal drums. The first metal drum was heated to a temperature of 325° C. while the second metal drum was heated to 340° C. The expanded microporous filled PTFE sheet was removed from the second metal drum as in Example 3.

The resultant inventive element was in the form of a rod. The following expansion ratios for the expanded microporous filled PTFE sheets produced rods of the invention having the following diameters:

| Expansion Ratio | Diameter |
| --- | --- |
| 4.18:1 | 7.9 mm |
| 5.42:1 | 7.1 mm |
| 7.74:1 | 6.4 mm |
| 8.20:1 | 4.8 mm |

Example 5

An expanded microporous PTFE sheet 0.23 mm wide and 0.01 mm thick expanded at a ratio of 80 to 1 and subjected to the amorphous locking process as taught in U.S. Pat. No. 3,953,566 to Gore was obtained. This PTFE sheet was passed around a 304.8 mm diameter metal drum heated to a temperature of 390° C. The PTFE sheet was removed from the drum at an angle of approximately 45° C. from the longitudinal axis of the PTFE sheet by a mechanized take-up at a speed of approximately 19 rev/min thereby causing the sheet of PTFE to helically roll upon itself and to produce the inventive element.

The resultant element was continuous in length and had a substantially round profile. The following physical properties were determined upon testing five samples taken from the inventive element:

| | |
|---|---|
| Diameter | 55 μm |
| Denier (g/9000 mm) | 48 |
| Longitudinal Tensile Strength | 703,000 ± 27,600 KPa |
| Modulus | $2.2 \times 10^7 \pm 4.8 \times 10^6$ KPa |

Example 6

A continuous biaxially expanded PTFE sheet was produced in accordance to U.S. Pat. Nos. 3,953,566 and 4,187,390 to Gore. Three transverse strips were cut from the sheet in order to measure transverse tensile strength. The average measurements taken were:

| | |
|---|---|
| Length | 16.7 cm |
| Width | 2.7 cm |
| Thickness | 0.0038 cm |
| Weight | 0.0841 gm |
| Breaking Load | 2149 gm force |

The following values were then calculated:

| | |
|---|---|
| Specific gravity | 0.49 gm/cc |
| Cross-sectional area | 0.0103 cm² |
| Tensile Strength | 20,500 KPa |

To compute matrix tensile strength of a porous specimen, the maximum force required to break the sample is divided by the cross sectional area of the porous sample and then this quantity is multiplied by the ratio of the specific gravity of the solid polymer divided by the specific gravity of the porous specimen. The specific gravity of the solid polymer was assumed to be 2.15 gm/cm³. The following matrix tensile strength was calculated for the transverse direction for the PTFE sheet.

Matrix tensile strength 90,000 KPa

This PTFE sheet was passed around a 304.8 mm diameter metal drum heated to a temperature of 390° C. The PTFE sheet was removed from the drum at an angle of approximately 45° from the longitudinal axis of the PTFE sheet by hand from the heated metal roller at a speed of approximately 9.1 rev/min thereby causing the sheet of expanded microporous PTFE to helically roll upon itself to produce the inventive element. Thermally protective gloves were worn by the operator to prevent burns from the removed element. Care was taken to maintain sufficient tension upon the PTFE sheet so that it remained in contact with the surface of the heated metal roller as the inventive element was removed.

The resultant element was continuous in length and had a substantially round profile. The material measured to be 0.546 cm in diameter.

A compressive cold flow evaluation was conducted using the above inventive material and ¼ inch GORE-TEX® Joint Sealant available from W. L. Gore and Associates, Inc., Elkton, Md. The test was conducted by applying 34,500 KPa compressive force on a 20.3 cm length of each sample of material placed between two plates. The GORE-TEX® Joint Sealant samples had a weight of 1.7 grams and the inventive material had a weight of 1.9 grams. One comparative test was conducted at ambient conditions and the other at 204°

C. The following measurements were taken:

| | Starting Diameter | Compressed Thickness | Compressed Width | Final Aspect Ratio |
|---|---|---|---|---|
| AMBIENT TEST (25° C.) | | | | |
| ePTFE Joint Sealant | 0.635 cm | 0.041 cm | 1.17 cm | 28.5:1 |
| Present Invention Joint Sealant | 0.546 | 0.064 | 0.86 | 13.4:1 |
| 204° C. TEST | | | | |
| ePTFE Joint Sealant | 0.635 cm | 0.024 cm | 1.93 cm | 80.4:1 |
| Present Invention Joint Sealant | 0.546 | 0.032 | 1.35 | 42.2:1 |

In both tests, the inventive material achieved a compressed final aspect ratio (width divided by thickness) of approximately half that of commercially available joint sealant. This demonstrates significantly less cold flow under both temperature conditions over conventional joint sealants.

While particular embodiments of the present invention have been illustrated and described herein, the present invention should not be limited to such illustrations and descriptions. It should be apparent that changes and modifications may be incorporated and embodied as part of the present invention within the scope of the following claims.

What is claimed is:

1. A gasket, having both longitudinal and transverse axes, that comprises:

a sheet of expanded polytetrafluoroethylene (PTFE) material, having a longitudinal axis and a transverse axis, the expanded PTFE material being oriented in at least its transverse axis;

the sheet of PTFE material being a roll wrapped upon itself essentially around the longitudinal axis of the sheet in the absence of a core;

wherein the gasket includes an edge adhered to the PTFE sheet; and the edge forms a spiraling seam wrapped around the gasket.

2. The gasket of claim 1 wherein the gasket material includes indentations therein.

3. The gasket of claim 1 wherein the PTFE sheet is coated with a polymeric material.

4. The gasket of claim 3 wherein the polymeric material is an elastomeric polymer selected from the group consisting of natural rubbers, synthetic rubbers, polyurethanes, and fluoroelastomers.

5. The gasket of claim 1 wherein a component is contained between rolled layers of the sheet of PTFE.

6. The gasket of claim 5 wherein the component comprises electrically conductive elements interspersed amongst the layers of PTFE.

7. The gasket of claim 5 wherein the component comprises a filament.

8. The gasket of claim 6 wherein the filament is an electrically conductive element.

9. The gasket of claim 6 wherein the filament provides structural support to the gasket.

10. A compressible gasket comprising:

a sheet of expanded polytetrafluoroethylene (PTFE) material, the PTFE material including a longitudinal axis and a transverse axis, the sheet having been expanded along at least its transverse axis;

the sheet spiral wrapped upon itself essentially around its longitudinal axis in the absence of a core to form a roll with multiple layers of PTFE sheet material and adhered in that orientation;

the gasket including at least one edge on an outside surface, the edge adhered to the sheet of PTFE, wherein the edge is spirally wrapped around the gasket along its length.

11. The gasket of claim 10 wherein a polymeric material is included between the layers of the gasket.

12. The gasket of claim 11 wherein the polymeric material comprises an adhesive.

13. The gasket of claim 11 wherein the polymeric material is electrically conductive.

14. The gasket of claim 10 wherein at least one component is rolled within the layers of the gasket.

15. The gasket of claim 14 wherein the component comprises an electrically conductive element.

16. The gasket of claim 14 wherein the component comprises a structural support element.

17. The gasket of claim 10 wherein the expanded PTFE material is expanded in multiple dimensions.

\* \* \* \* \*